United States Patent
Paulussen et al.

(10) Patent No.: US 9,938,388 B2
(45) Date of Patent: Apr. 10, 2018

(54) PLASMA ASSISTED HYDROPHILICITY ENHANCEMENT OF POLYMER MATERIALS

(71) Applicant: VITO NV (VLAAMSE INSTELLING VOOR TECHNOLOGISCH ONDERZOEK NV), Mol (BE)

(72) Inventors: Sabine Paulussen, Deurne (BE); Gabriella Da Ponte, Kraainem (BE)

(73) Assignee: VITO NV (VLAAMSE INSTELLING VOOR TECHNOLOGISCH ONDERZOEK NV), Mol (BE)

( * ) Notice: Subject to any disclaimer, the term of this patent is extended or adjusted under 35 U.S.C. 154(b) by 0 days.

(21) Appl. No.: 15/143,071

(22) Filed: Apr. 29, 2016

(65) Prior Publication Data

US 2016/0319092 A1 Nov. 3, 2016

(30) Foreign Application Priority Data

Apr. 30, 2015 (EP) .................................... 15166055

(51) Int. Cl.
| | |
|---|---|
| *B01D 65/08* | (2006.01) |
| *B01D 71/34* | (2006.01) |
| *C08F 259/08* | (2006.01) |
| *C08F 261/06* | (2006.01) |
| *C08J 7/18* | (2006.01) |
| *B05D 3/14* | (2006.01) |
| *B29C 59/14* | (2006.01) |
| *C08J 7/12* | (2006.01) |
| *B01D 67/00* | (2006.01) |
| *B01D 71/68* | (2006.01) |
| *B01D 71/36* | (2006.01) |

(52) U.S. Cl.
CPC ............ *C08J 7/18* (2013.01); *B01D 65/08* (2013.01); *B01D 67/009* (2013.01); *B01D 67/0093* (2013.01); *B05D 3/141* (2013.01); *B05D 3/142* (2013.01); *B05D 3/144* (2013.01); *B29C 59/14* (2013.01); *C08F 259/08* (2013.01); *C08F 261/06* (2013.01); *C08J 7/123* (2013.01); *B01D 71/34* (2013.01); *B01D 71/36* (2013.01); *B01D 71/68* (2013.01); *B01D 2323/02* (2013.01); *B01D 2323/42* (2013.01); *B29K 2995/0092* (2013.01); *C08J 2327/16* (2013.01); *C08J 2327/18* (2013.01); *C08J 2329/10* (2013.01)

(58) Field of Classification Search
CPC .. B01D 65/08; B01D 67/009; B01D 67/0093; B01D 2323/02; B01D 2323/42; B01D 71/34; B01D 71/36; B01D 71/68; B29K 2995/0092; B05D 3/141; B05D 5/142; B05D 3/144; B29C 59/14; C08F 259/08; C08F 261/06; C08J 7/123; C08J 7/18; C08J 2327/16; C08J 2327/18; C08J 2329/10

See application file for complete search history.

(56) References Cited

U.S. PATENT DOCUMENTS

| | | |
|---|---|---|
| 5,080,924 A | 1/1992 | Kamel et al. |
| 2010/0056652 A1 | 3/2010 | Duong et al. |
| 2011/0060402 A1 | 3/2011 | Kitching et al. |

FOREIGN PATENT DOCUMENTS

| | | |
|---|---|---|
| CN | 103263863 A | 8/2013 |
| WO | 2007127989 A2 | 11/2007 |
| WO | 2008060522 A2 | 5/2008 |
| WO | WO-2008/119823 A1 * | 10/2008 |
| WO | 2009037331 A1 | 3/2009 |
| WO | 2010043684 A1 | 4/2010 |

OTHER PUBLICATIONS

Critical Surface Tension and Contact Angle with Water for Various Polymers downloaded from https://www.accudynetest.com/polytable_03.html?sortby=contact_angle Jun. 20, 2017.*

European Search Report from European Patent Application No. 15166055.2, dated Nov. 26, 2015, 5 pages.

* cited by examiner

*Primary Examiner* — Irina S Zemel
*Assistant Examiner* — Jeffrey S Lenihan
(74) *Attorney, Agent, or Firm* — Merchant & Gould P.C.

(57) ABSTRACT

A method of enhancing hydrophilicity of a hydrophobic polymer material includes pre-treating the hydrophobic polymer material. The pre-treating includes treating the hydrophobic polymer material with a first atmospheric pressure plasma discharge in a first atmosphere including carbon dioxide to obtain a pre-treated polymer material. The method includes treating the pre-treated polymer material with a second atmospheric pressure plasma discharge in a second atmosphere in which an aerosol of an amine is introduced; the amine includes at least one hydrocarbon substituent. A substrate is provided that includes a hydrophobic polymer material having a modified interface. The modified interface includes amine functional groups grafted on the hydrophobic polymer material, the modified interface having a surface energy, which, measured after immersion in water at 20° C. for 3 days, differs from a surface energy of the hydrophobic polymer material by 20 mN/m or less.

20 Claims, 3 Drawing Sheets

PLASMA ASSISTED HYDROPHILICITY ENHANCEMENT OF POLYMER MATERIALS

CROSS REFERENCE TO RELATED APPLICATIONS

This application claims benefit of Serial No. 15166055.2, filed 30 Apr. 2015 in Europe and is incorporated herein by reference. To the extent appropriate, a claim of priority is made to the above disclosed application.

BACKGROUND OF THE INVENTION

The present invention is related to methods of plasma treatment of polymer materials in order to modify the surface of these materials for improving the hydrophilic character of the surfaces, and to materials obtained by such methods. The plasma treatment involves an atmospheric pressure plasma.

A lot of polymers having a stable structure, which resists attack from various solvents, or from environmental conditions have the drawback of being poorly wettable. Surface wettability is however an interesting property for industrial applications. In the prior art, attempts have been made to modify the surface of such polymer materials by a plasma treatment.

WO 2009/037331 describes to apply a hydrophilic coating on a substrate by exposing the substrate to an atmospheric pressure plasma discharge in which an aerosol of a non-polymerizable acetate derivative, such as ethyl acetate, is introduced. Treatment of poly(ethylene terephtalate) with this method resulted in a reduction of the contact angle with water from 67° to 10° and for poly(propylene) a reduction from 98° to 10° was reported. The reduction is reported to be stable for several months.

US 2011/0060402 describes methods for surface modifying a hydrophobic polymer such as expanded poly tetrafluoroethylene (ePTFE) by pre-treating the hydrophobic polymer sequentially with low pressure (sub atmospheric) plasmas, dip coating the hydrophobic polymer material with a hydrophilic coating, e.g. polyethylene glycol (PEG) acrylate, and polymerizing the hydrophilic coating by exposure to a low pressure plasma.

CN 103263863 describes a method of improving the surface hydrophilicity of a polyether sulfone (PES) ultrafiltration membrane by treating the membrane using a low temperature plasma discharge, and by grafting an acrylic monomer on the plasma treated membrane in a vacuum oven. An increase of pure water flux of the membrane is reported.

The inventors have observed that in most cases the hydrophilic properties of the modified surface regressed with time, in particular when the surface is contacted with water.

An objective of aspects of the present invention is to provide an improved method of modifying the surface of a hydrophobic polymer. An objective of further aspects of the present invention is to provide a hydrophobic polymer material having a surface which is modified to have improved hydrophilic properties. It is an object to provide such methods and/or materials which provide improved stability of one or more hydrophilic properties when the surface is aged in water. It is also an object to provide such methods and/or materials which are easier to implement or manufacture and more cost effective.

According to a first aspect of the invention, there is therefore provided a method for enhancing hydrophilicity of a hydrophobic polymer material, as set out in the appended claims.

According to a second aspect of the invention, there is provided a substrate comprising, or consisting of a hydrophobic polymer material having a modified interface, as set out in the appended claims.

According to another aspect of the invention, which alternatively can be combined with any of the previous aspects of the invention, there is provided a method of plasma treating a hydrophobic polymer material, said method comprising arranging the hydrophobic polymer material on a porous support and applying suction pressure through the porous support during the plasma treating.

BRIEF DESCRIPTION OF THE DRAWINGS

Aspects of the invention will now be described in more detail with reference to the appended drawings, wherein same reference numerals illustrate same features and wherein.

DETAILED DESCRIPTION

Figure 1:
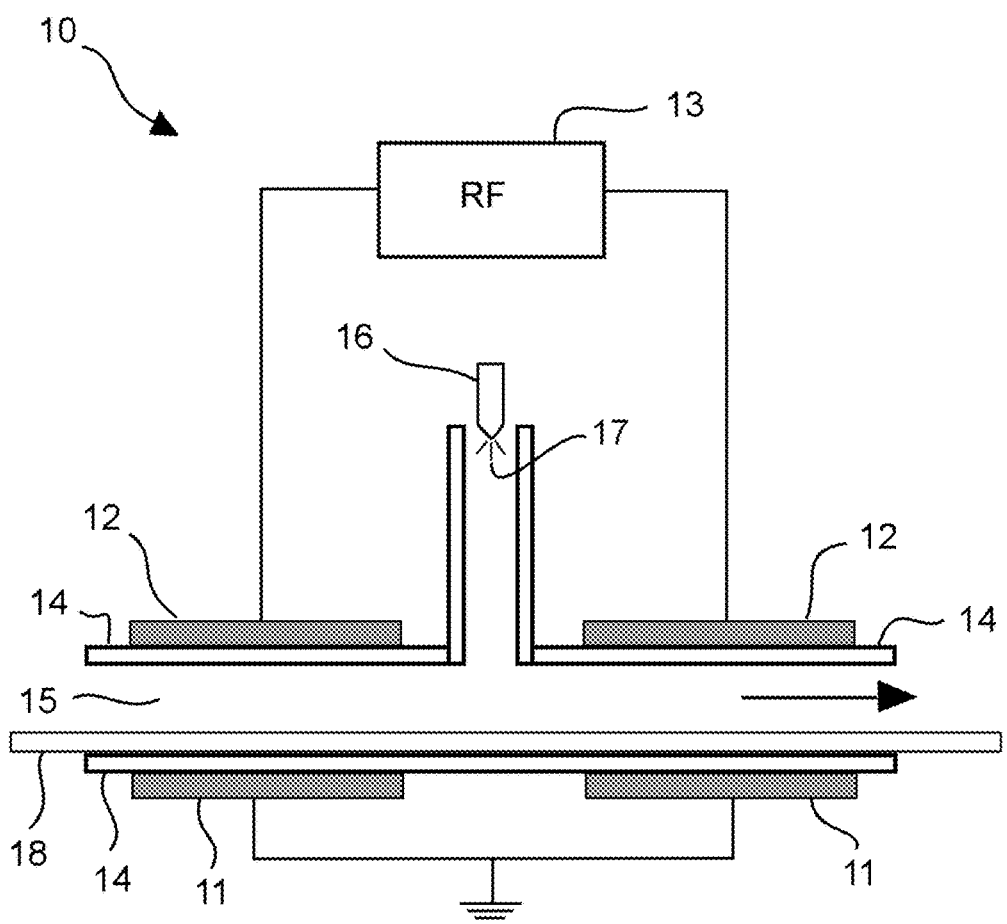
FIG. 1 represents a schematic view of a dielectric barrier discharge apparatus as can be used in methods of the present invention.

A (untreated, native) hydrophobic polymer material advantageously refers to a polymer material having a contact angle with water of at least 65°, advantageously at least 69°. Hydrophobic materials include but are not limited to: poly(ethylene terephtalate) (PET), polyethylene (PE), polystyrene (PS), polycarbonate (PC), polypropylene (PP), polyvinyl chloride (PVC), or polyvinylidene chloride (PVDC).

The hydrophobic materials suitable in aspects of the present invention are advantageously fluorinated polymers, such as poly(tetra fluoroethylene) (PTFE), polyvinylydene fluoride (PVDF), polyvinyl fluoride (PVF), or perfluoroalkoxy alkane (PFA). More advantageously, the fluorinated polymers are polytetrafluoroethylene (PTFE), polyvinylidene fluoride (PVDF), or perfluoroalkoxy alkane (PFA).

The hydrophobic materials suitable in aspects of the present invention are advantageously sulfonated polymers, such as polysulfone (PSU), polyether sulfone (PES), or polyphenylene sulphide (PPS). More advantageously, the sulfonated polymers are polyethersulfone (PES), or polysulfone (PSU).

The hydrophobic materials suitable in aspects of the present invention can be provided in the form of films, sheets, plates or panels. They can be powders or granular materials.

Alternatively, the hydrophobic polymer materials can be provided in a porous form, such as semi-permeable membranes, in particular membranes having a pore size of at least 20 nm, advantageously at least 50 nm. There is a risk that pores smaller than the indicated sizes would become damaged during treatment according to methods of the invention. Suitable semi-permeable membranes are microfiltration and ultrafiltration membranes.

Semi-permeable membranes as referred to in the present invention are advantageously membranes obtained by subjecting a polymer solution to a phase separation process. Phase separation, which is also referred to as phase inversion, is a well-known process wherein demixing between the polymer and the solvent is induced. As a result of demixing, the polymer precipitates, thereby forming a membrane lattice with a desired structure (pore size, pore structure, etc.). Further process steps can be carried out in order to remove the solvent completely (e.g., washing in a possibly hot water bath) and to obtain a final pore structure (e.g., removing pore formers by washing in a bleach solution). Demixing can be induced based on several techniques. One possibility is thermally induced phase separation (TIPS), wherein demixing is induced by a temperature change at the interface of the polymer solution. Another possibility is to induce a chemical reaction in the polymer solution, causing demixing. This is referred to as reaction induced phase separation (RIPS). However, in the vast majority of cases, demixing is induced by phase diffusion. The polymer solution is contacted with another phase, being a liquid (liquid induced phase separation or LIPS), or a gas (vapour, referred to as vapour induced phase separation or VIPS), which is a non-solvent of the polymer but which is miscible with the solvent of the polymer solution. The liquid or vapour will diffuse through the polymer solution and cause a local change in the polymer solution composition, inducing demixing. As a result, the polymer precipitates from the solution. LIPS is also referred to as immersion precipitation. It will be convenient to note that any phase separation process can be applied to prepare the membranes as described herein.

The membrane comprises or consists of an advantageously thermoplastic polymer compound, which is the hydrophobic polymer material. The hydrophobic polymer material is the principal or primary polymeric compound used for preparing the membrane forming solution, e.g. the polymer compound present in largest amount in the membrane forming solution.

The amount of the hydrophobic polymer material in the (dry) (final) membrane is advantageously at least 5% by weight, advantageously at least 10% by weight, advantageously at least 25% by weight, advantageously at least 35% by weight, advantageously at least 50% by weight. The hydrophobic polymer material advantageously forms an organic binder forming a matrix or lattice of the membrane, in which a filler material may optionally be dispersed. The filler material may be organic and can be an amine, such as but not limited to one or a combination of: monoethanolamine (MEA), diethanolamine (DEA), polyethylenimine (PEI), aminopropyl-trimethoxysilane and polyethylenimine-trimethoxysilane. The filler material can be an amide or amine containing polymer, such as but not limited to one or a combination of: polyamide (PA), polyurethane (PUR), polyvinylamine (PVAm) and melamine. The filler material may be inorganic, such as one or a combination of $TiO_2$, $HfO_2$, $Al_2O_3$, $ZrO_2$, $Zr_3(PO_4)_4$, $Y_2O_3$, $SiO_2$, carbon, possibly on Pt, Ru or Rh support, $BaSO_4$, $BaTiO_3$, perovskite oxide powder materials, zeolites, metal-organic frameworks (MOF) and silicon carbides. Functionalized variants of the filler materials (such as aminated, sulfonated, acrylated) can be used. Combinations of the above organic and inorganic materials can be used as well as filler material.

The membrane may be reinforced with a support.

Methods of enhancing the hydrophilicity of polymers according to aspects of the present invention comprise a pre-treatment step and a plasma treatment step. The pre-treatment step is also a plasma treatment.

The plasma in both the pre-treatment and the treatment step is an atmospheric pressure plasma. Such atmospheric pressure plasma is advantageously obtained by dielectric barrier discharge (DBD) technology.

Referring to FIG. 1, in a DBD apparatus 10, the plasma is generated between two parallel and oppositely arranged electrodes 11, 12, which can be made of metal, such as stainless steel. One electrode 11 is advantageously grounded, whereas the other electrode 12 can be electrically connected to a high voltage (HV) generator 13 (AC), operable to provide a high voltage (1-40 kV), advantageously at a frequency between 1 kHz and 100 kHz.

One of the electrodes, and advantageously both are covered with a dielectric layer 14, such as glass, at the side facing the opposite electrode. The electrodes 11, 12 are spaced apart to provide a gap 15 between them (or between the dielectric layers 14) having a clearance which is usually limited to several millimeters, such as between 1 mm and 5 mm, to ensure stable plasma operation.

In order to obtain a plasma discharge, a plasma gas, such as nitrogen or argon, is made to flow in the gap 15 by means known in the art. In addition to the plasma gas, chemical precursors can be introduced in the atmosphere in gap 15. Typical chemical precursors are liquid and are generally nebulized with appropriate atomizers 16 to produce an aerosol 17. Droplet sizes are distributed in the range of 10-200 nm with advantageously a maximum concentration in the range between 20 nm and 100 nm, advantageously between 25 nm and 75 nm, advantageously around 50 nm. Such low particle size generated by the atomizer ensures optimum reaction conditions in the plasma. The chemical precursors can either be carried along with the plasma gas, or can be directly introduced in the gap 15, depending on where the atomizer 16 is arranged.

The DBD set-up is ideally suited for treatment of plastic foils or films 18 and the materials treated are in direct contact with the plasma.

Figure 2:
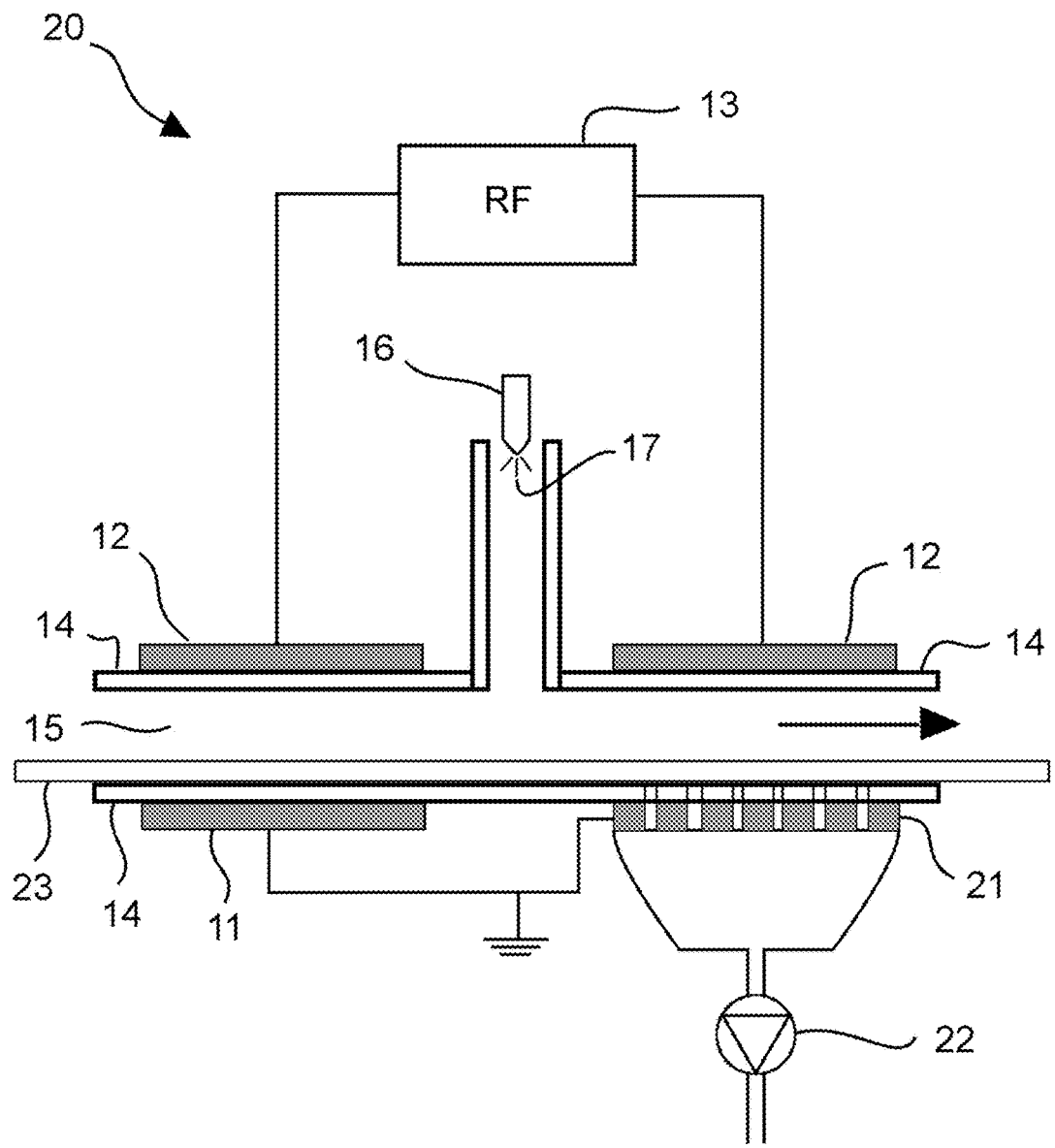
FIG. 2 represents a schematic view of an alternative dielectric barrier discharge apparatus, particularly suited for treatment of porous materials.

Referring to FIG. 2, an alternative DBD apparatus 20 differs from DBD apparatus 10 in that the ground electrode 11 is replaced with a porous electrode 21, possibly formed of a metal mesh, which possibly acts as ground electrode. A vacuum pump 22 is fluidly connected with the side of porous electrode 21 opposite the HV electrode 12. In the DBD apparatus 20, no dielectric layer is provided on the porous electrode 21, although one may be provided if desired.

The set-up of FIG. 2 is suitable for treatment of porous materials, such as semi-permeable membranes 23. These porous materials 23 are advantageously placed on the porous electrode 21 during plasma treatment. The vacuum pump 22 is arranged to apply suction pressure (vacuum or slight underpressure) by the vacuum pump through the pores of porous electrode 21, which will advantageously suck the plasma gas, and possibly any chemical precursor into the porous structure of the material 23. The generation of suction pressure (vacuum or slight underpressure) by the vacuum pump 22 is intended to encourage the reactive species generated in the plasma to pass through the pore network of the material 23 inducing a proper functionalization of the external and internal part of the membrane. An in-depth treatment is therefore obtained.

Figure 3:
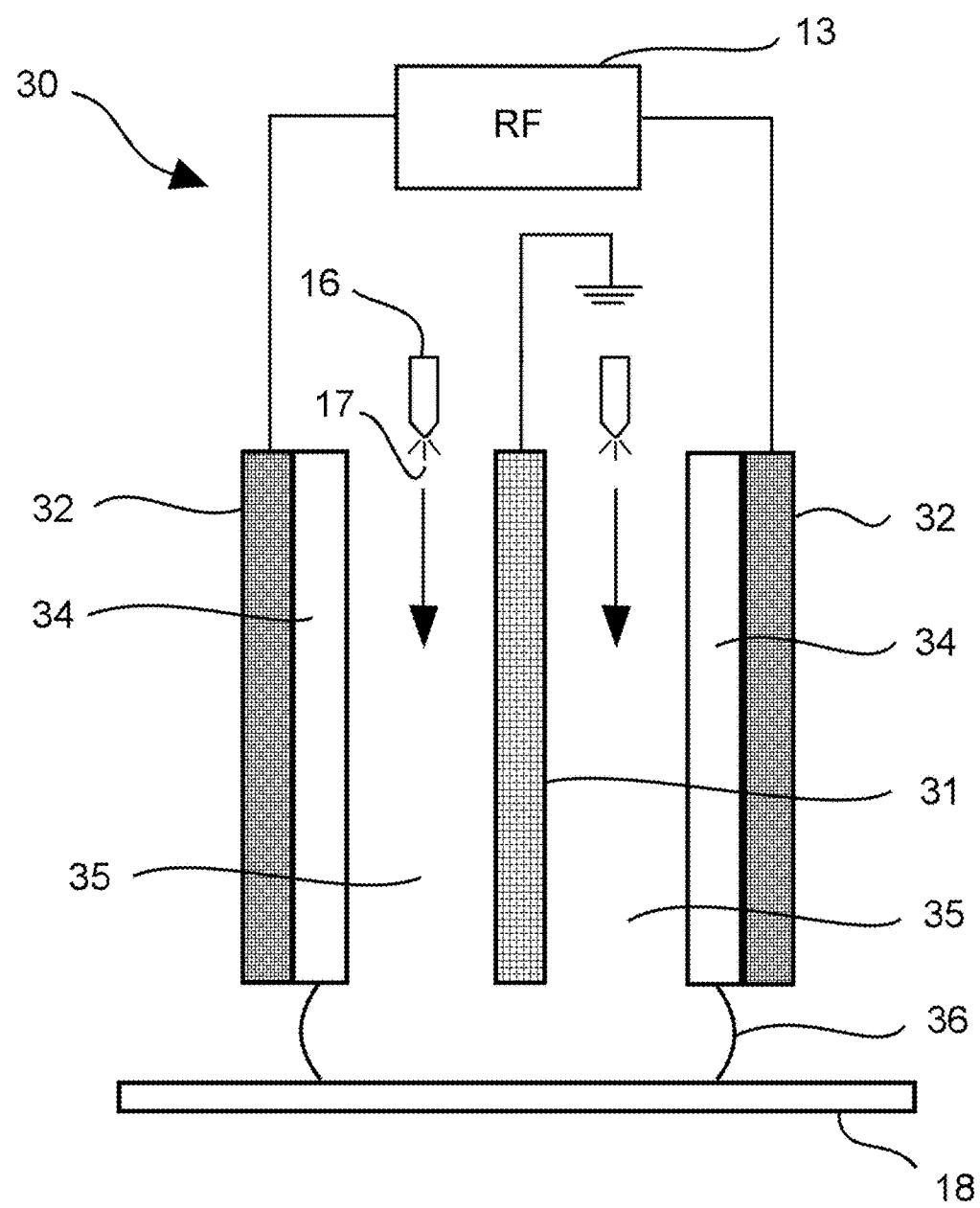
FIG. 3 represents a schematic view of a plasma torch as can be used in methods of the present invention.

An alternative plasma treatment apparatus which can be used in methods according to the present invention is shown in FIG. 3. Depicted is a so called plasma torch 30, comprising a possibly grounded elongated central electrode 31, surrounded by a HV electrode 32. The HV electrode 32, the central electrode 31, or both can be covered with a dielectric layer 34 on the side facing the other electrode. The electrodes 31, 32 are spaced apart to define a gap 35 axially around the central electrode 31. The plasma is generated in this gap 35 by making a plasma gas flow along the gap. The plasma gas can be a same gas as for the DBD apparatuses described above, possibly with chemical precursors as described. It will hence be clear that the plasma generated in plasma torch 30 is also a DBD plasma discharge.

At the outlet of torch 30, where the plasma gas is blown out of the torch, a so-called afterglow 36 is formed, referring to a gas which has just gone through a plasma discharge and is therefore highly reactive, or carries along highly reactive species. The plasma treatment is effected by contacting the material 18 with the afterglow. As a consequence, the substrate material is not in direct contact with the plasma.

It will hence be clear that plasma treatments in methods according to the present invention can relate to "direct" plasma treatments, in which the material to be treated is placed in (i.e. is exposed to) the plasma discharge. Plasma treatments may also refer to "indirect" plasma treatments, in which the material to be treated is exposed to a reactive gas stream resulting from a plasma discharge (afterglow).

The pre-treatment step of the method of the present invention comprises, or consists of treating the hydrophobic polymer material (directly or indirectly) with a first atmospheric pressure plasma discharge, which can be a DBD discharge. This first atmospheric pressure plasma discharge is generated in an atmosphere comprising gaseous carbon dioxide. In addition to carbon dioxide, the atmosphere advantageously comprises a gas, such as nitrogen or argon, with nitrogen being particularly suitable. Particularly advantageous are atmospheres consisting (essentially) of carbon dioxide and nitrogen.

The treatment step, which follows the pre-treatment step, comprises or consists of treating the pre-treated polymer material (directly or indirectly) with a second atmospheric pressure plasma discharge, which can be a DBD discharge. This second atmospheric pressure plasma discharge is generated in an atmosphere comprising a plasma gas, such as nitrogen or argon, advantageously nitrogen, in which a chemical precursor is introduced. The chemical precursor is advantageously liquid and atomized to an aerosol as described above.

According to an aspect of the invention, an amine comprising at least one hydrocarbon substituent (on the nitrogen of the amine functional group) is used as chemical precursor. Without wishing to be bound by theory, it is believed that the pre-treatment with carbon dioxide generates carboxyl groups (—COOH) on the surface of the polymer material, which readily react with the amino groups (—$NH_2$) of the amine.

More particularly, according to an aspect of the present invention, stable chemical anchorage groups are generated on the surface of the hydrophobic polymer material for subsequent linking with complementary chemical functionalities, resulting in a surface modification showing improved stability over aging in aqueous environments.

The at least one hydrocarbon substituent (of the amine used as chemical precursor in the present invention) refers to a C1-C60, advantageously a C2-C40, advantageously a C3-C20, advantageously a C3-C10, advantageously a C3-C4, advantageously a C3 hydrocarbon substituent having a straight or a branched carbon chain.

The amine used as chemical precursor in the treatment step of the invention can be a primary, secondary, or tertiary amine. Advantageously, the amine is a primary amine.

The at least one hydrocarbon substituent of the amine can be saturated, i.e. having no double carbon bonds (no C=C bonds).

Alternatively, the at least one hydrocarbon substituent of the amine can be unsaturated, i.e. having at least one double carbon bond (C=C bond). More particularly, the at least one hydrocarbon substituent of the amine can have one, two, three, or more double carbon bonds.

It is believed that the (at least one) C=C double bond leads to a more stable grafting of the amino group on the polymer material, compared to precursors which are not provided with such double carbon bond. A particularly advantageous precursor is allyl amine. As will be shown in the examples below, the combination of carbon dioxide and allyl amine plasma treatments results in a surface modification with amino groups which shows improved stability over aging in aqueous environments.

Advantageously, the at least one hydrocarbon substituent is an aliphatic, unsaturated hydrocarbon substituent having a straight carbon chain comprising at least one double carbon bond.

Advantageously, the amine has one hydrocarbon substituent (i.e. is a primary amine), the hydrocarbon substituent being unsaturated and having a straight carbon chain comprising at least one double carbon bond.

It will be convenient to note that a combination of different precursors, e.g. amines wherein the at least one hydrocarbon substituent is saturated and amines wherein the at least one hydrocarbon substituent is unsaturated, may be used in methods of the invention.

Advantageously, the plasma gas used in the pre-treatment and in the treatment steps is the same. By way of example, it can be advantageous to use nitrogen as plasma gas in the second atmospheric pressure plasma when it is also used in the first plasma. Similarly, if argon is used as plasma gas in the second plasma, it can be advantageous to use it also in the first plasma. It will be convenient to note that a combination of different gasses may be used as plasma gas, e.g. as atmosphere for the plasma discharge. The use of nitrogen gas may be preferred over argon gas.

Advantageously, the use of nitrogen gas is preferred over argon gas. Particular advantageous is the use of nitrogen as plasma gas in the first and second atmospheric pressure plasma.

It will be convenient to note that the operational parameters for plasma generation will depend on the kind of atmosphere used, for example in case of using nitrogen, a dissipated power of the plasma discharge advantageously falls in the range between 150 W/$cm^2$ and 600 W/$cm^2$, advantageously at least 200 W/$cm^2$ and advantageously at most 500 W/$cm^2$. In case of using argon, the dissipated power advantageously falls in the range between 10 W/$cm^2$ and 100 W/$cm^2$. Argon, being an inert gas, allows using lower powers, which may better retain original molecular structures of the precursor, such as the amino group.

In further aspects, the present invention is related to the surface modified polymer material as obtained, or obtainable, by the above methods. Hence, a substrate, which comprises, or consists of the surface modified polymer material advantageously shows, at the modified surface (also referred to as interface), an improved stability of the surface energy after aging in water.

Substrates according to aspects of the present invention hence comprise a hydrophobic polymer material having a modified interface (surface), wherein the modified interface comprises amine functional groups (also referred to as amine group, or amino group) grafted on the hydrophobic polymer material. The modified interface can form a grafted layer on the hydrophobic polymer material, e.g. a grafted layer which is discernibly distinct from the bulk material.

Advantageously, the modified interface has a surface energy, which, measured after immersion in water at 20° C. for 3 days, differs from a surface energy of the (untreated, non-plasma-treated) hydrophobic polymer material by 20 mN/m or less, advantageously by 15 mN/m or less, advantageously by 10 mN/m or less.

Suitable methods for measuring water contact angles (WCA) and surface energy (SE) will be apparent for those skilled in the art.

In the present description, static water contact angle (SWCA) measurements were performed with a Contact angle DATAPHYSICS OCA-2 goniometer, managed by OCA-2 software, by using 3 µl droplets of double distilled water and diiodomethane. The surface energy was calculated based on the Owens-Wendt-Kaelble method using the water and diiodomethane contact angles.

Advantageously, the surface energy of the modified interface, measured after immersion in water at 20° C. for 3 days, is at least 45 mN/m (or 45 dynes/cm), advantageously at least 50 mN/m, advantageously at least 55 mN/m. Advantageously, the surface energy of the modified interface, measured immediately after having modified the interface (i.e. immediately after plasma treatment), is at least 70 mN/m, advantageously at least 75 mN/m. Advantageously, the surface energy of the modified interface decreases with 25 mN/m or less, advantageously with 20 mN/m or less, after having immersed the substrate, including the modified interface, in water at 20° C. for three days, compared to the measurement immediately after having modified the interface.

Advantageously, the modified interface has an amine ($NH_2$) density which is at least five times higher than an amine density of the (untreated, non-modified surface of the) hydrophobic polymer material, advantageously at least ten times higher, advantageously at least fifteen times higher, advantageously at least twenty times higher.

Without wishing to be bound by theory, it is believed that the amine functional groups grafted on the hydrophobic polymer material at the modified interface are covalently bonded to the hydrophobic polymer material, seen the stable hydrophilic character of the modified surface of the polymer material after aging in water (as demonstrated by the examples below).

Advantageously, the modified interface has an amine ($NH_2$) density of at least 2500 pmol/cm$^2$, advantageously at least 4000 pmol/cm$^2$, advantageously at least 4500 pmol/cm$^2$.

A substrate, which comprises, or consists of the surface modified polymer material obtained by the methods of the present invention advantageously shows, at the modified surface (interface), an improved stability of the water contact angle after aging in water.

Advantageously, the hydrophobic polymer material is selected from the group consisting of polytetrafluoroethylene (PTFE), polyvinylidene fluoride (PVDF), perfluoroalkoxy alkane (PFA), polyethersulfone (PES), polysulfone (PSU), and polystyrene (PS), and the modified interface has a contact angle with water, measured after immersion in water at 20° C. for 3 days, of 60° or less, advantageously 55° or less, advantageously 50° or less, advantageously 45° or less.

Advantageously, the substrate is a semi-permeable membrane, advantageously a microfiltration membrane, advantageously made of a fluorinated or sulfonated polymer having a modified interface. The contact angle with water at the modified interface, e.g. at the surface pores, is 60° or less, advantageously 55° or less, advantageously 50° or less, advantageously 45° or less, after immersion in water at 20° C. for three days. Advantageously the modified surface extends between a top surface and a bottom surface of the semi permeable membrane. Advantageously, the modified surface extends over a top (external) surface and over a bottom (external) surface arranged opposite the top surface.

It will be convenient to note that other functional groups can be grafted by methods of the invention in addition to amino groups. These additional groups may contribute to hydrophilicity of the substrate.

EXPERIMENTS

Example 1: Influence of Chemical Precursor—No Pre-Treatment

Hydrophilicity of two polymeric film substrates was examined for different plasma treatments. A first substrate is a PVDF film from Solvay Specialty Polymers (Italy), more particularly, PVDF08, a 60 µm thick film, made out of a suspension homopolymer of low molecular weight.

A second substrate is a PVDF film in which a certain amount of acrylic acid was added to the polymer formulation (referred to as PVDF+AA). Both films were plasma treated in a parallel plate DBD apparatus as shown in FIG. 1.

The following conditions were applied:
Step 1: Plasma Pre-Treatment
Plasma gas: $N_2+CO_2$ (with a ratio $N_2/CO_2$ of 4%) or $Ar+CO_2$ (with a ratio $Ar/CO_2$ of 4%)
Gas flow: 20 mL/min
Frequency applied to DBD electrode: 1.5 kHz
Power dissipated: 450 W/cm$^2$ in case of $N_2$; 50 W/cm$^2$ in case of Ar
Gap in DBD apparatus: 2 mm
Number of passes through DBD apparatus: 4
Speed through DBD apparatus: 4 m/min
Step 2: Plasma Treatment with Precursor
Plasma gas: $N_2$ or Ar
Gas flow: 20 mL/min
Precursors used: Allyl amine (ALA) or Propyl amine (PRA)
Gas flow on precursor: 2 SLM
Frequency applied to DBD electrode: 1.5 kHz
Power dissipated: 450 W/cm$^2$ in case of $N_2$; 50 W/cm$^2$ in case of Ar
Gap in DBD apparatus: 2 mm
Number of passes through DBD apparatus: 4
Speed through DBD apparatus: 4 m/min.

After plasma treatment, the surface energy (SE) of the modified surface (plasma coating) was measured, both immediately after treatment and after water immersion at 20° C. for 3 days. In some cases the —$NH_2$ groups on the modified surface were quantified, after water immersion at 20° C. for 3 days, by reversible ionic dye binding method. The results are summarised in Table 1.

The reversible ionic dye binding method for quantifying the —$NH_2$ groups was based on: Christian Geismann, Mathias Ulbricht *Macromol. Chem. Phys.* 2005, 206, 268-281; and A. Papra, H. G. Hicke and D. Paul, *J. Appl. Polym. Sci.*, 1999, 74, 1669-1674.

The applied procedure for —$NH_2$ groups quantification consists of the following 4 steps:
1) Bind: Membrane samples were shaken overnight in a solution of 500 µmol/L Acid Orange II (CAS 633-96-5) in water (pH 3, HCl) at room temperature;
2) Wash: The samples were washed three times with water (pH 3);

3) Elute: Immersed in 10 mL of water (pH 12, NaOH). Shake for 15 min;
4) Measure fluorescence spectrum at 479 nm.

The following solutions were made for the different steps pointed out above:
1) acid orange: 500 μmol→0.0175 g in 100 ml water pH 3 (HCl) flask, again make solution 100 times more concentrated: 1.75 g acid orange (K1L7) in 100 ml flask with Water pH 3 (0.001M HCl see point 2). Take 1 ml from this solution and add 1 ml of 0.1M HCl and dilute till 100 ml with water.
2) HCl PH 3: 35% HCl in K4L4→super concentrated=10M. pH 3=diluted 10000 times. Make a solution 100 times diluted: 1 ml of 35% HCl in flask of 100 ml→100 times diluted=0.1M HCl. Take 1 ml of this solution in a flask of 100 ml=0.001M HCl=pH 3=10000 times diluted.
3) NaOH: 250 ml water in flask of 250 ml+100 mg NaOH=Water pH 12.

TABLE 1

Results of surface energy and —$NH_2$ groups quantification for the experiments in example 1. ALA = allyl amine; PRA = Propyl amine; SE = surface energy. $NH_2$ groups on the modified surface quantified after water immersion at 20° C. for 3 days.

| | Plasma process | | Characterization | | |
|---|---|---|---|---|---|
| | STEP 1 | STEP 2 | SE, before water immersion SE (dynes/ | SE, after 3 days in water | —$NH_2$ groups density on surface |
| Material | Pre-treatment | Chemical precursor | cm) | (dynes/cm) | (pmol/cm$^2$) |
| PVDF | — | — | 37 ± 1 | | 240 |
| | $N_2 + CO_2$ | — | | | 270 |
| | — | $N_2$ + ALA | 69 ± 1 | 41 ± 1 | |
| | $N_2 + CO_2$ | $N_2$ + ALA | 76 ± 1 | 55 ± 1 | 4200 |
| | $N_2 + CO_2$ | $N_2$ + PRA | 73 ± 1 | 55 ± 1 | 640 |
| | — | Ar + ALA | 71 ± 1 | 39 ± 1 | |
| | Ar + $CO_2$ | Ar + ALA | 76 ± 1 | 37 ± 1 | |
| | Ar + $CO_2$ | Ar + PRA | 58 ± 1 | 55 ± 1 | |
| PVDF + AA | — | — | 38 ± 1 | | 170 |
| | $N_2 + CO_2$ | — | | | 720 |
| | $N_2 + CO_2$ | $N_2$ + ALA | 77 ± 1 | 55 ± 1 | 4900 |
| | $N_2 + CO_2$ | $N_2$ + PRA | 70 ± 1 | 45 ± 1 | 1200 |
| | Ar + $CO_2$ | Ar + ALA | 75 ± 1 | 53 ± 1 | |
| | Ar + $CO_2$ | Ar + PRA | 60 ± 1 | 45 ± 1 | |

A first evaluation of the efficiency of the plasma treatment has been performed by surface energy (SE) measurements. This technique is very fast and a straightforward surface characterization method that allows to qualitatively verify the ability of the plasma to impart a hydrophilic character to the hydrophobic polymers indicated above.

As can be seen from Table 1, a plasma pre-treatment with carbon dioxide in the presence of nitrogen allows maintaining the surface energy at higher levels after water immersion.

The increased hydrophilicity is also shown by the —$NH_2$ groups quantification in Table 1. When argon is used as plasma gas, it was however found that the coatings deposited with either allyl amine and propyl amine were completely dissolved in the water-based dye solutions. Hence, no values could be quantified in case of using argon as plasma gas.

Example 2: Plasma Treatment of Powder

A perfluoroalkoxy alkane (PFA) powder with particle size of 35 μm was plasma treated under the same conditions as in example 1, using nitrogen as plasma gas. In this experiment, the —$NH_2$ groups density on the surface of the powder particles after a plasma treatment was quantified using the same dye method as in example 1, both immediately after treatment and after aging in water for 24 hours. The results are shown in Table 2.

TABLE 2

Evaluation of stability of modified surface of PFA powder (35 μm grain size) before and after aging in water at 20° C. for 24 hours.

| | Plasma process | | Characterization | |
|---|---|---|---|---|
| | | | —$NH_2$ groups density on surface, before contact with | —$NH_2$ groups density on surface, after |
| Material | STEP 1 Pre-treatment | STEP 2 Chemical precursor | water (sites/ g of powder) | water immersion for 24 h (sites/g of powder) |
| PFA powder (35 μm) | — | — | 3.36134E+16 | |
| | $N_2$ | $N_2$ + ALA | 9.18653E+17 | 2.98158E+17 |
| | $N_2 + CO_2$ | $N_2$ + ALA | 9.19362E+17 | 4.20081E+17 |

Table 2 shows clearly the advantageous effects of carbon dioxide in the plasma pre-treatment step. Immediately after plasma treatment, the number of $NH_2$ sites at the surface is the same after pre-treatment with both pure nitrogen and $N_2+CO_2$. However, after aging in water, using carbon dioxide in the plasma atmosphere during pre-treatment allows for retaining a larger number of $NH_2$ sites on the surface of the powder particles. Hence, the use of carbon dioxide gives rise to coatings obtained with amine based precursors having increased stability.

The invention claimed is:

1. Method of enhancing hydrophilicity of a hydrophobic polymer material, comprising:
   pre-treating the hydrophobic polymer material, comprising treating the hydrophobic polymer material with a first atmospheric pressure plasma discharge in a first atmosphere comprising carbon dioxide to obtain a pre-treated polymer material; and
   treating the pre-treated polymer material with a second atmospheric pressure plasma discharge in a second atmosphere in which an aerosol of an amine is introduced, said amine comprising at least one hydrocarbon substituent, wherein the hydrophobic polymer material is a powder.

2. Method of claim 1, wherein the at least one hydrocarbon substituent of the amine is unsaturated.

3. Method of claim 2, wherein the first and/or second atmosphere comprises nitrogen.

4. Method of claim 3, wherein the first atmosphere essentially consists of carbon dioxide and nitrogen.

5. Method of claim 1, wherein the first and/or second atmosphere comprises nitrogen.

6. Method of claim 5, wherein the first atmosphere essentially consists of carbon dioxide and nitrogen.

7. Method of claim 1, wherein the hydrophobic polymer material is a material having a contact angle with water of at least 65°.

8. Method of claim 1, wherein the hydrophobic polymer material is a material essentially made of a fluorinated or sulfonated polymer.

9. Method of claim 8, wherein the hydrophobic polymer material is selected from the group consisting of: polytetrafluoroethylene (PTFE), polyvinylidene fluoride (PVDF), perfluoroalkoxy alkane (PFA), polyethersulfone (PES), and polysulfone (PSU).

10. Method of claim 1, wherein pre-treating and/or treating the hydrophobic polymer material comprises arranging the hydrophobic polymer material on a porous support and applying suction pressure through the porous support during atmospheric pressure plasma discharge.

11. Method of claim 1, wherein the aerosol consists of droplets having a size in the range between 10 and 200 nm.

12. Method of claim 1, wherein said amine is allyl amine.

13. Method of claim 12, wherein the first and/or second atmosphere comprises nitrogen.

14. Method of claim 13, wherein the first atmosphere essentially consists of carbon dioxide and nitrogen.

15. Method of enhancing hydrophilicity of a hydrophobic polymer material, comprising:
    pre-treating the hydrophobic polymer material, comprising treating the hydrophobic polymer material with a first atmospheric pressure plasma discharge in a first atmosphere comprising carbon dioxide to obtain a pre-treated polymer material; and
    treating the pre-treated polymer material with a second atmospheric pressure plasma discharge in a second atmosphere in which an aerosol of an amine is introduced, said amine comprising at least one hydrocarbon substituent, wherein the hydrophobic polymer material is a semi-permeable membrane.

16. Method of claim 15, wherein pre-treating and/or treating the hydrophobic polymer material comprises arranging the hydrophobic polymer material on a porous support and applying suction pressure through the porous support during atmospheric pressure plasma discharge.

17. Method of claim 15, wherein the at least one hydrocarbon substituent of the amine is unsaturated.

18. Method of claim 15, wherein the first and/or second atmosphere comprises nitrogen.

19. Method of claim 15, wherein the hydrophobic polymer material is a material essentially made of a fluorinated or sulfonated polymer.

20. Method of claim 15, wherein the aerosol consists of droplets having a size in the range between 10 and 200 nm.

* * * * *